US011840280B2

(12) United States Patent
Kosaka (10) Patent No.: US 11,840,280 B2
(45) Date of Patent: Dec. 12, 2023

(54) REINFORCEMENT FOR A VEHICLE STRUCTURAL MEMBER AND METHOD FOR MANUFACTURING THE SAME

(71) Applicant: TOYODA IRON WORKS CO., LTD., Toyota (JP)

(72) Inventor: Hiroyasu Kosaka, Toyota (JP)

(73) Assignee: TOYODA IRON WORKS CO., LTD., Toyota (JP)

( * ) Notice: Subject to any disclaimer, the term of this patent is extended or adjusted under 35 U.S.C. 154(b) by 213 days.

(21) Appl. No.: 17/257,790

(22) PCT Filed: Jun. 28, 2019

(86) PCT No.: PCT/JP2019/025876
§ 371 (c)(1),
(2) Date: Mar. 22, 2022

(87) PCT Pub. No.: WO2020/009034
PCT Pub. Date: Jan. 9, 2020

(65) Prior Publication Data
US 2022/0219759 A1 Jul. 14, 2022

(30) Foreign Application Priority Data
Jul. 4, 2018 (JP) ................ 2018-127705

(51) Int. Cl.
*B62D 25/04* (2006.01)
*B21D 22/26* (2006.01)

(52) U.S. Cl.
CPC ............. *B62D 25/04* (2013.01); *B21D 22/26* (2013.01)

(58) Field of Classification Search
CPC ...... B62D 25/04; B62D 27/023; B21D 22/26; B21D 22/20; B21D 24/005
USPC ........................................ 296/193.06, 29, 30
See application file for complete search history.

(56) References Cited

U.S. PATENT DOCUMENTS 6,814,401 B2 * 11/2004 Takada .................. E05B 85/045
296/202
9,731,339 B2 8/2017 Miyagi et al.
2014/0028056 A1 1/2014 Nishimura et al.

FOREIGN PATENT DOCUMENTS

| CN | 104903020 A | 9/2015 |
|---|---|---|
| JP | H02-60681 U | 5/1990 |
| JP | 2002-254114 A | 9/2002 |
| JP | 2013-220807 A | 10/2013 |
| JP | 2014-24467 A | 2/2014 |
| JP | 2015-066584 A | 4/2015 |
| JP | 2017-197191 A | 11/2017 |

OTHER PUBLICATIONS

May 19, 2022 Office Action issued in Chinese Patent Application No. 201980044220.5.
(Continued)

*Primary Examiner* — Dennis H Pedder
(74) *Attorney, Agent, or Firm* — Oliff PLC (57) ABSTRACT

A reinforcement for a vehicle structural member, includes a top wall, and opposite lateral walls extending from opposite edges of the top wall. At least one of the lateral walls includes a flat surface portion for mounting an additional vehicle part. The flat surface portion has an edge forward in a press direction in which the reinforcement is pressed, the edge being curved and convex in the press direction.

5 Claims, 11 Drawing Sheets

(56) References Cited

OTHER PUBLICATIONS

Sep. 24, 2019 International Search Report issued in International Patent Application No. PCT/JP2019/025876.
Jan. 5, 2021 International Preliminary Report on Patentability issued in International Patent Application No. PCT/JP2019/025876.

* cited by examiner

REINFORCEMENT FOR A VEHICLE STRUCTURAL MEMBER AND METHOD FOR MANUFACTURING THE SAME

CROSS REFERENCE TO RELATED APPLICATIONS

The present application is a U.S. National Phase entry of, and claims priority to, PCT Application No. PCT/JP2019/025876, filed Jun. 28, 2019, which claims priority to Japanese Patent Application No. 2018-127705, filed Jul. 4, 2018, both of which are incorporated herein by reference in their entireties for all purposes.

BACKGROUND

The present disclosure relates to a reinforcement for a vehicle structural member and a method for manufacturing the same.

A vehicle, such as an automobile, typically includes pillars on its sides, serving as structural members. Such pillars include a front pillar, commonly referred to as an A-pillar, a center pillar, commonly referred to as a B-pillar, and a rear pillar, commonly referred to as a C-pillar, arranged from the front to the rear of the automobile. Among these pillars, the center pillar is particularly required to have a structural strength to resist a side collision with an automobile. The center pillar is therefore provided with a reinforcement, which may be called a hinge reinforcement, to reinforce its strength.

The pillar may be provided with a mounting portion for attaching an additional vehicle part situated near the pillar, and therefore need strength for this attachment purpose. For example, a lock striker that keeps a side door in the closed position may be attached to the center pillar. The hinge reinforcement, which is a reinforcement of the center pillar, is provided with a flat surface portion for attaching the striker.

The center pillar is elongated and has a closed cross section comprising an outer panel having a hat-shaped cross section and a planar inner panel. The hinge reinforcement is arranged within the closed cross section of the center pillar and is joined to the outer panel by welding, or other means, to reinforce the center pillar.

Since placed inside the closed cross section of the center pillar, the hinge reinforcement is elongated and has a U--shaped cross section, in accordance with the inner surfaces of the outer panel of the hat-shaped cross section. The configuration of U-shaped cross section comprises a top wall in the middle in the width direction (vehicle front-rear direction) and opposite lateral walls extending from the opposite edges of the top wall, bent to form ridges. The hinge reinforcement includes, in one of the lateral walls, a flat surface portion for mounting the lock striker, which is an additionally attached part mentioned above.

Hinge reinforcements are formed by pressing. A single steel sheet is bent by pressing into a U-shaped cross section (see Japanese Patent Application Publication No. 2013-220807). The press forming process typically employs two kinds of press forming dies, one for drawing and the other for unbending.

Another technique in this field is described in Japanese Patent Application Publication Nos. 2002-254114 and 2015-066584.

SUMMARY

The material used for the hinge reinforcement tends to have a higher strength, due to the recent demand for improved performance against side impact. Wrinkles, once formed during a press forming process when a high-strength material is used, are difficult to be smoothed and flattened within the same press forming process. In other words, when the material strength is not high, any wrinkles formed during the forming process can be smoothed and flattened at the final pressing step of the forming process. However, in the case of a high-strength material, wrinkles once formed are difficult to be flattened in the subsequent pressing step because of the high strength of the material. Moreover, it is difficult to remove wrinkles by other means after the press forming process. It should be noted that the wrinkles considered a problem herein are undulation formed. during the press forming process.

It is therefore needed to prevent formation of wrinkles when press forming the striker mounting flat surface portion of the lateral wall of the hinge reinforcement described above, or any other portions where a highly accurate flatness without wrinkles or undulation is required after press forming.

When press forming a reinforcement having a flat surface portion for attaching an additional part, it is thus desired to prevent or suppress formation of undulation or wrinkles in the flat surface portion, even when using a high-strength material.

One aspect of the present disclosure provides a reinforcement for a vehicle structural member, comprising a top wall, and opposite lateral walls extending from opposite edges of the top wall. At least one of the lateral walls includes a flat surface portion for mounting an additional vehicle part. The flat surface portion has an edge forward in a press direction in which the reinforcement is pressed, the edge being curved and convex in the press direction.

In some embodiments, the vehicle structural member is a pillar installed on a side of the vehicle, and the reinforcement is a hinge reinforcement for reinforcing the pillar.

In some embodiments, the additional vehicle part is a striker for locking a vehicle door, and the striker is attached to the flat surface portion.

Another aspect of the present disclosure provides a method of manufacturing a reinforcement for a vehicle structural member according to any of claims 1 to 3. The method comprises press forming the reinforcement with a press forming die. The press forming die includes a first die face corresponding to the flat surface portion of the lateral wall and a second die face corresponding to a portion of the lateral wall adjacent to the flat surface portion. The first die face is curved and convex forward in the press direction relative to the second die face.

In some embodiments, the step of press forming comprises drawing the reinforcement with a drawing die, and unbending the drawn reinforcement with an unbending die. The drawing die and the unbending die each include the first die face that is curved and convex.

In some embodiments, when press forming a vehicle reinforcement having a flat surface portion for mounting an additionally attached part, it is possible to prevent or suppress the formation of undulating wrinkles during press forming, even when using a high-strength material.

DETAILED DESCRIPTION

Embodiments of the present disclosure will be described below with reference to the drawings. In one embodiment, the vehicle structural member is a center pillar, which is one of the pillars of a side of an automobile or other vehicle, and the reinforcement is a hinge reinforcement that reinforces the center pillar. The directional terms used in the following descriptions basically refers to the direction based on the vehicle in the normal position. In each figure, arrow FR indicates the vehicle forward direction, arrow UP the vehicle upward direction, and arrow IN the vehicle inward direction.

Figure 1:
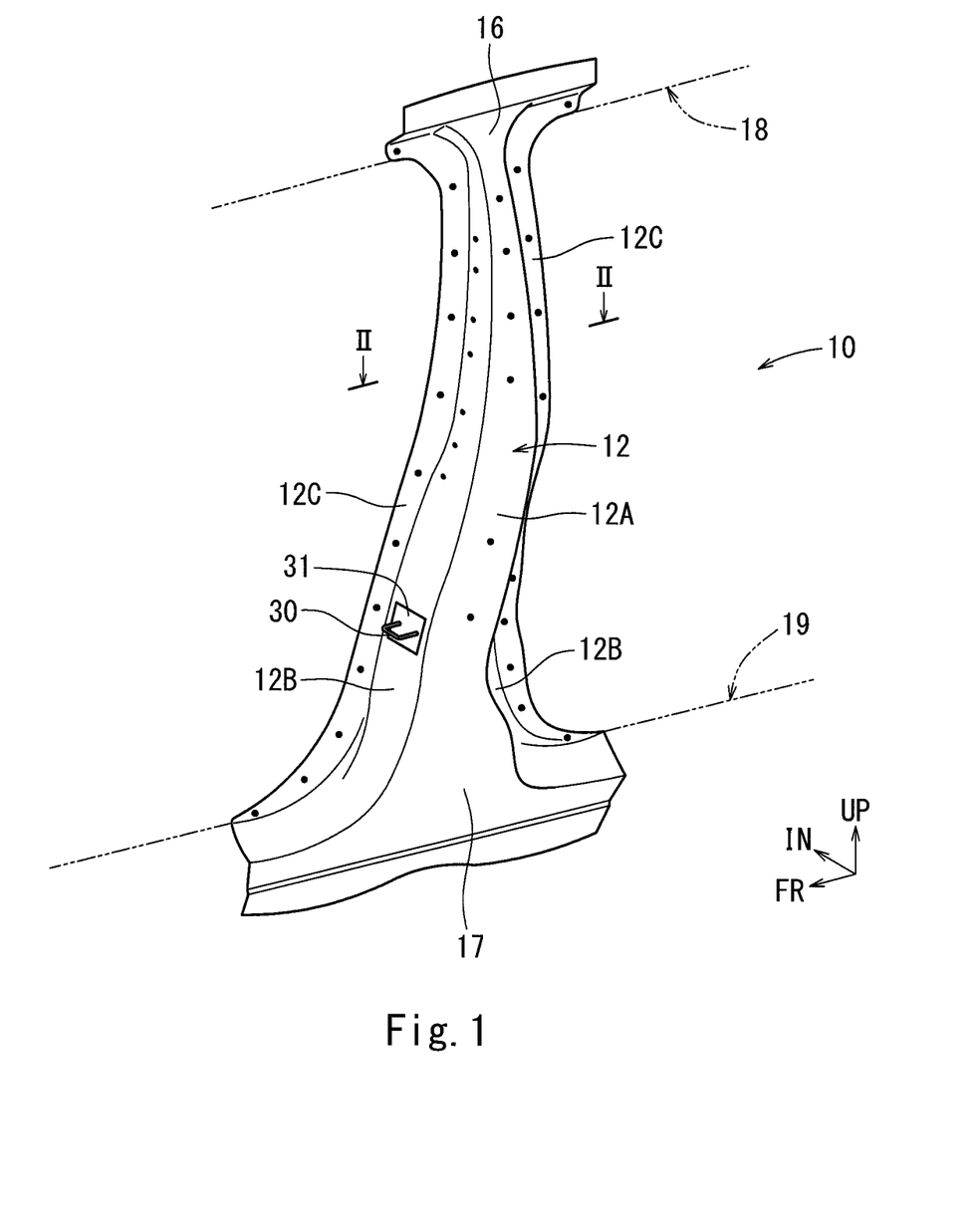
FIG. 1 is an overall view of an exemplary center pillar arranged in a side of a vehicle, such as an automobile.
Figure 2:
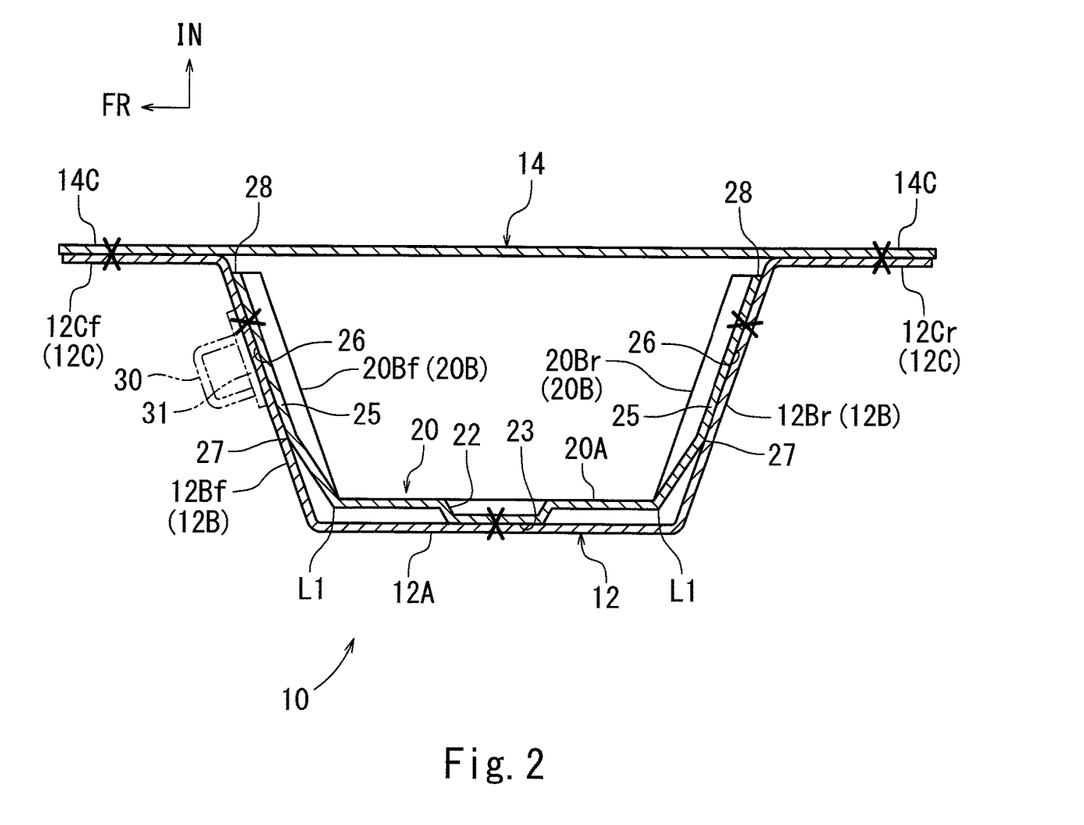
FIG. 2 is a cross-sectional view of the center pillar of FIG. 1 taken along line II-II.

FIG. 1 shows the exterior of the center pillar 10 for an automobile or other vehicle, and FIG. 2 shows a cross section of the center pillar 10 of FIG. 1 taken along line II-II. The center pillar 10 shown in FIG. 1 is that of the left side of the vehicle. In addition to the center pillar 10, a front pillar (not shown) and a rear pillar (not shown) may be arranged in the side of the vehicle, as vehicle structural members. The strength of the center pillar 10, among these pillars, is considered important because of the need for countermeasures against a side collision with an automobile. Therefore, as shown in FIG. 2, the center pillar 10 is provided with a hinge reinforcement 20 to reinforce its strength. In one embodiment, a high-strength steel sheet may be used, as will be further described later, to satisfy the recent demand for even higher strength.

As shown in FIGS. 1 and 2, the center pillar 10 includes an elongated outer panel 12 that forms the vehicle outer side of the center pillar 10 and an elongated inner panel 14 that forms the vehicle inner side of the center pillar 10. The center pillar 10 further includes a hinge reinforcement 20 arranged inside the outer panel 12.

The outer panel 12 has a hat-shaped cross section, open toward the inside of the vehicle, and includes a top wall 12A, lateral walls 12B, and flanges 12C. The top wall 12A is situated on the vehicle outer side (lower side as seen in FIG. 2), and the left and right lateral walls 12B extend toward the vehicle inner side (upward as seen in FIG. 2) from the opposite edges of the top wall 12A. The left and right lateral walls 12B are inclined such that the distance between them increases toward the inside of the vehicle (upward as seen in FIG. 2). The flanges 12C extend in opposite directions from the inward edges (upward edges in FIG. 2) of the lateral walls 121. The flanges 12C extends parallel to the top wall 12A.

When it is needed to distinguish between the symmetrically arranged lateral walls 12B and flanges 12C in the following descriptions, those on the vehicle rearward side (right side as seen in FIG. 2) will be denoted by their reference symbols followed by an "r," and those on the vehicle forward side (left side) by their reference symbols followed by an "f."

As shown in FIG. 2, the inner panel 14 is generally planar, and the flanges 14C extends outward from the opposite side edges on the vehicle forward and rearward sides (left and right ends as seen in FIG. 2). The flanges 14C of the inner panel 14 are held against the flanges 12C of the outer panel 12 in the vehicle width direction and joined thereto by spot welding to form a closed cross section. The welding spots are indicated by dots in FIG. 1 and crosses in FIG. 2. The welding method is not limited to spot welding, but may instead be other welding methods, such as laser welding.

As shown in FIG. 1, the center pillar 10 is arranged in a vertical position in the vehicle. The center pillar 10 is gently curved, such that it is convex toward the vehicle outside in the middle of its length. The center pillar 10 is inclined rearward of the vehicle at the upper end relative to the lower end.

As shown in FIGS. 1 and 2, the elongated center pillar 10 has a closed cross section, and thus defines an interior space. The center pillar 10 is joined to the roof side rail 18 via a generally T-shaped attachment portion 16 at the upper end of the outer panel 12. The center pillar 10 is also joined to the side sill 19 via a generally T-shaped attachment portion 17 at the lower end of the outer panel 12.

The outer panel 12 may be made of a sheet of steel having a tensile strength of 1180 MPa or more. In one embodiment, a sheet of 1470 MPa high-strength steel may be used. The outer panel 12 may be formed by a room temperature pressing, a cold pressing, or a hot stamping. The inner panel 14 may be made of a sheet of steel having a tensile strength equal to or lower than the tensile strength of the outer panel 12. In a particular embodiment, a 590 MPa steel sheet may be used. The inner panel 14 is formed by a room temperature press.

The hinge reinforcement 20 arranged in the interior space of the center pillar 10 will now be described. As best shown in FIG. 2, the hinge reinforcement 20 is disposed along the inner surface of the outer panel 12 of the center pillar 10. The hinge reinforcement 20 includes a top wall 20A and lateral walls 20B.

To be arranged along the inner surface of the outer panel 12 of the center pillar 10 as described above, the hinge reinforcement 20 has a generally U-shaped cross section. The top wall 20A is positioned along the inner side of the top wall 12A of the outer panel 12. The two lateral walls 20B as seen in FIG. 2 are positioned along the inner sides of the lateral walls 12B of the outer panel 12. The two lateral walls 20B extend continuously from the opposite edges of the top wall 20A toward the vehicle inside (upward as seen in FIG. 2), forming the ridge lines L1. The lateral walls 20B of the hinge reinforcement 20, like the lateral walls 12B of the outer panel 12, are inclined in a direction in which the distance between them increases toward the vehicle inside (upward as seen in FIG. 2).

As with the outer panel 12, when it is needed to distinguish the symmetrically arranged left and right lateral walls 20B of the hinge reinforcement 20, that on the vehicle rearward side (right side as seen in FIG. 2) will be denoted by its reference symbol followed by an "r," and that on the vehicle forward side (left side as seen in FIG. 2) by its reference symbol followed by an "f."

The vehicle doors (not shown) are arranged on the forward and rearward sides of the center pillar 10 shown in FIG. 1. (left and right sides as seen in FIG. 1). A front door is arranged on the forward side of the center pillar 10, and a rear door is arranged on the rearward side of the center pillar 10. The front door is opened and closed by one or more door hinges secured to the front pillar, and is locked onto the center pillar 10 by a lock striker 30 secured to the center pillar 10. As shown in FIG. 1, the lock striker 30 is positioned on the forward side of the center pillar 10, near the lower end. Although the position of taking the cross section of the center pillar shown in FIG. 2 differs from the position of the lock striker 30, the lock striker 30 is shown in FIG. 2 by two-dot chain lines for an image of where in the forward lateral wall 12Bf and 20Bf the lock striker 30 is located.

Figure 10:
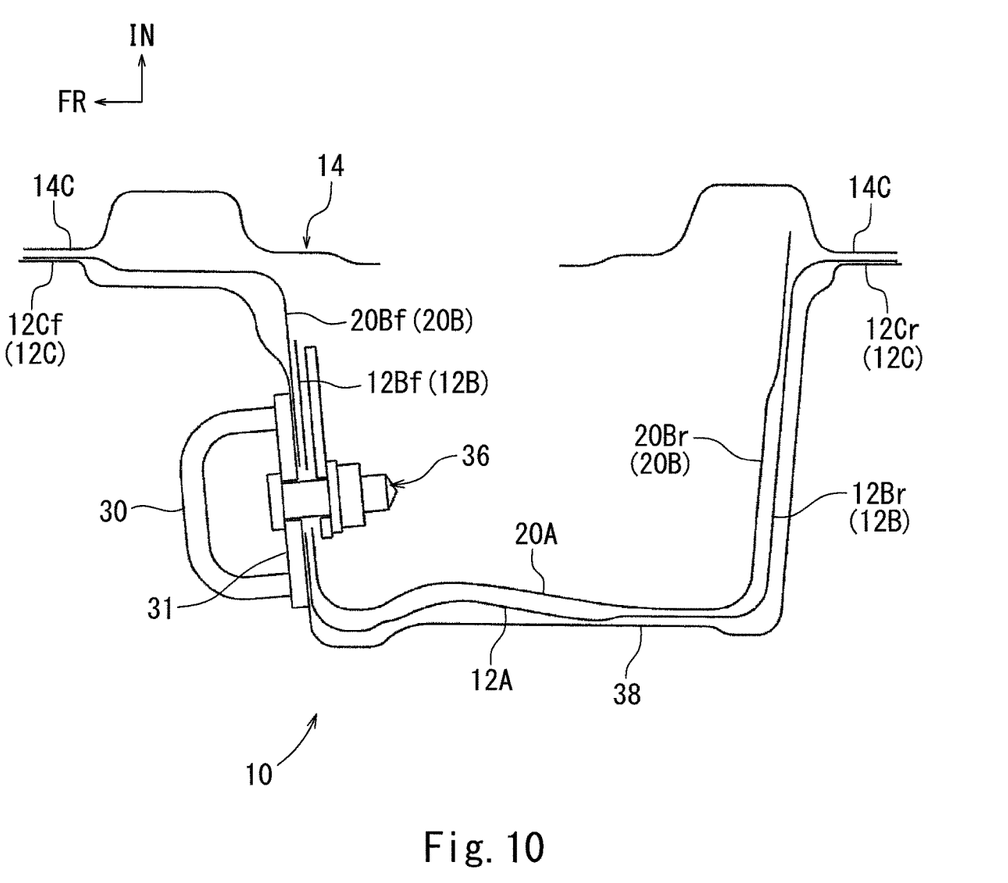
FIG. 10 is a cross-sectional view of a lock striker attached to a center pillar.

FIG. 10 shows a lock striker 30 mounted to the center pillar 10 in a specific embodiment. In this figure, the outer panel 12, the inner panel 14, and the hinge reinforcement 20 are drawn with thickness omitted. As can be seen from FIG. 10, the lock striker 30 is arranged on the forward lateral walls 12Bf and 20Bf of the outer panel 12 and hinge reinforcement 20. The lock striker 30 is mounted to the lateral walls 12Bf and 20Bf on the lock striker base 31 by a fastener 36, such as bolt and nut. An exterior panel 38 covers the outer side of the outer panel 12.

Figure 3:
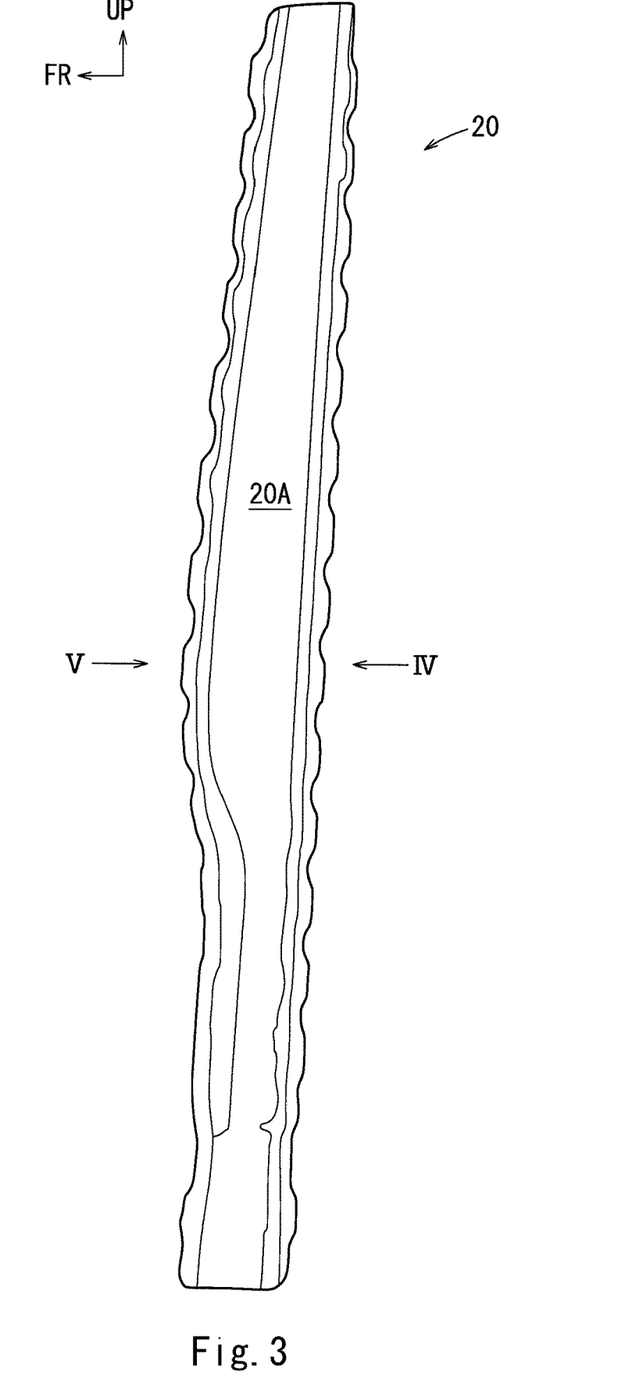
FIG. 3 is a front view of the top wall of the hinge reinforcement after the second step (in its final form) as seen from the outside of the vehicle.
Figure 4:
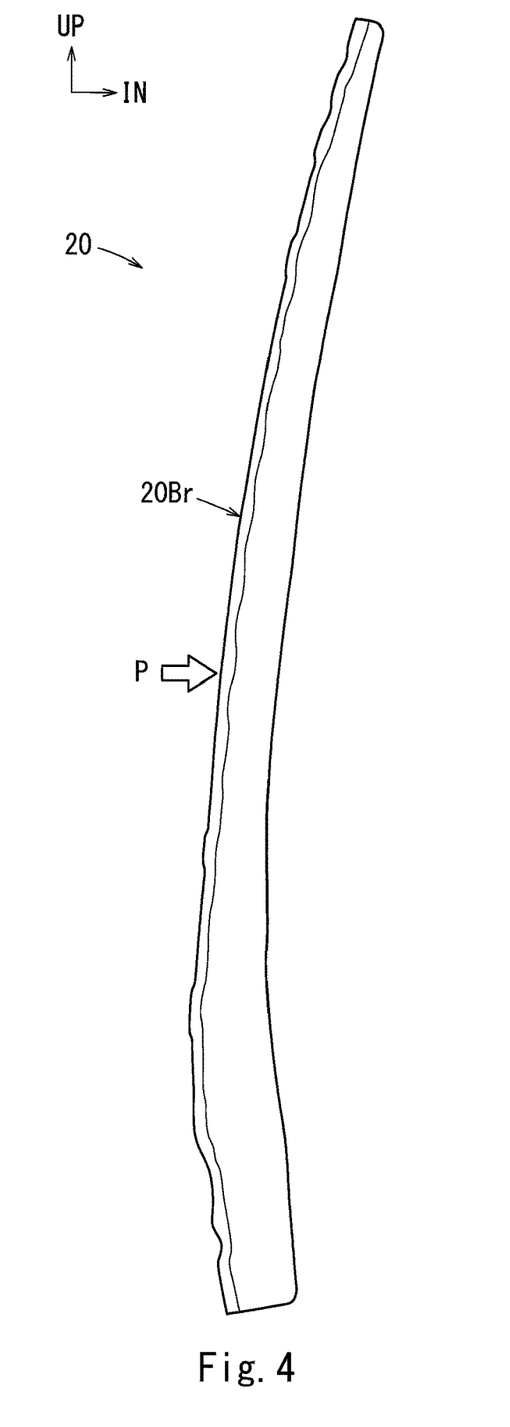
FIG. 4 is a side view of the lateral wall on the vehicle rearward side of the hinge reinforcement of FIG. 3 as seen from the direction of arrow IV.
Figure 5:
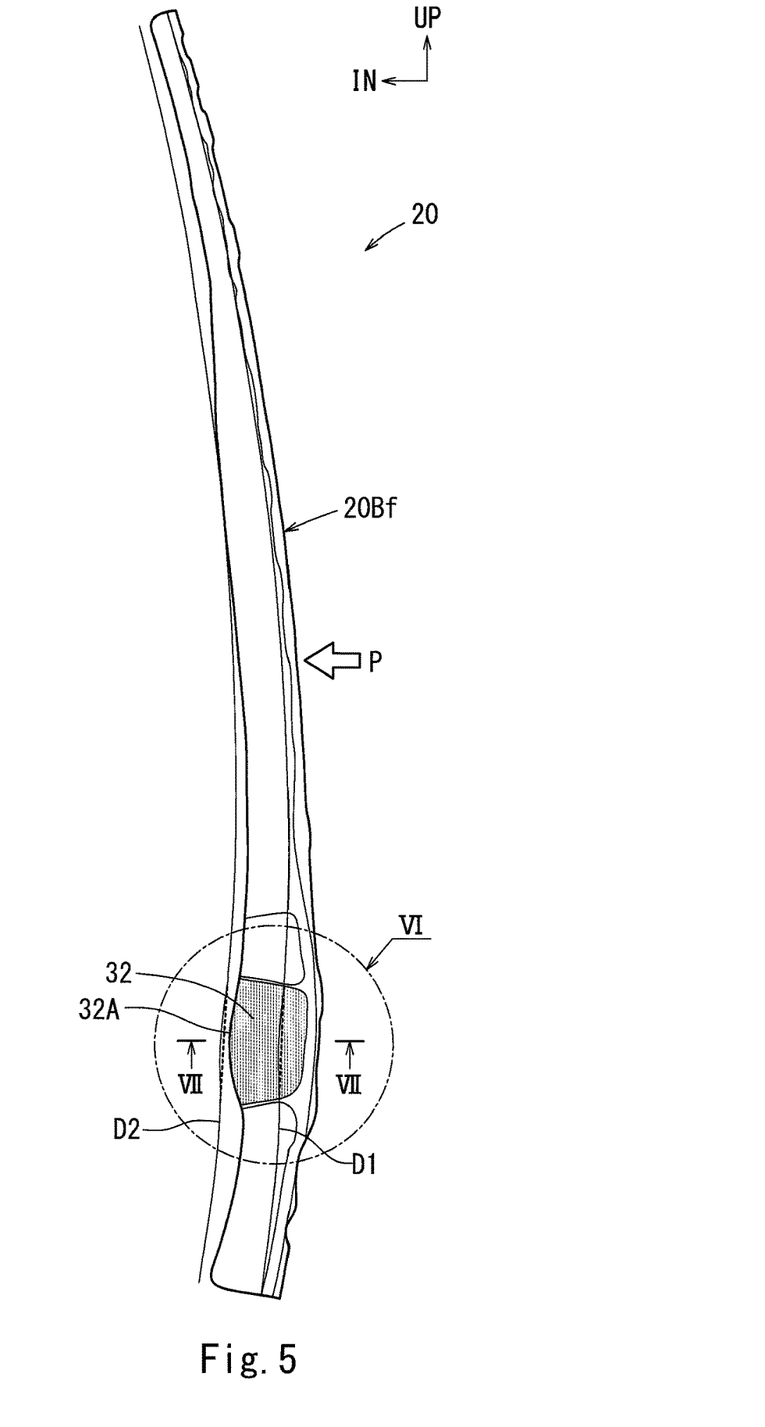
FIG. 5 is a side view of the lateral wall on the vehicle forward side of the hinge reinforcement of FIG. 3 as seen from the direction of arrow V.

FIGS. 3 to 5 show the overall configuration of the hinge reinforcement 20. The hinge reinforcement 20 shown is in a form as a final product of the press forming process, which will be described later. FIG. 3 is a view of the top wall 20A of the hinge reinforcement 20 as seen from the vehicle outside. FIG. 4 shows a lateral wall 20Br on the vehicle rearward side of the hinge reinforcement 20 of FIG. 3 as viewed from the direction of arrow IV. FIG. 5 shows a lateral wall 20Bf on the vehicle forward side of the hinge reinforcement 20 shown in FIG. 3 as viewed from the direction of arrow V. As shown in these drawings, the hinge reinforcement 20 is elongated, and, as shown in FIGS. 4 and 5, the hinge reinforcement 20 is gently curved such that it is convex toward the vehicle outside.

The hinge reinforcement 20 is formed by pressing. As the material for the press forming, a sheet of high-strength steel may be used to enhance the performance against lateral collision. The tensile strength of the steel may be 980 MPa or more. In some embodiments, a high-strength steel sheet of 1180 MPa may be used. The thickness of the steel sheet is, for example, about 1 to 2 mm. The single sheet of high-strength steel is press-formed by a room temperature pressing, a cold pressing, or a hot stamping.

Although not shown in FIGS. 3 to 5, but as shown in FIG. 2, the top wall 20A of the hinge reinforcement 20 is joined by spot welding to the inner surface of the top wall 12A of the outer panel 12 of the center pillar 10. For this joining purpose, the top wall 20A of the hinge reinforcement 20 includes welding projections 22, each projecting from the top wall 20A toward the outside of the vehicle by a height to form a raised welding surface 23. The welding projections 22 are scattered along the vertical direction of the vehicle.

The outer surface of the welding projection 22, i.e. the raised welding surface 23, is flat, as shown in FIG. 2, in order to secure the strength of the spot welding joint with the top wall 12A of the outer panel 12. In some embodiments, the shape of each welding projection 22 may be semicircular or circular. However, in other embodiments, it may take various other shapes, such as a rectangle, triangle, ellipse, or hexagon.

The center pillar 10 and the hinge reinforcement 20 may also be welded between the lateral walls 12B of the outer panel 12 and the lateral walls 20B of the hinge reinforcement 20 at the spots indicated by crosses in FIG. 2. Accordingly, the lateral walls 20Br, 20Bf of the hinge reinforcement 20 shown in FIGS. 4 and 5 each include a plurality of welding projections 25, each forming a raised welding surface 26. In FIGS. 4 and 5, however, the welding projections 25 of the lateral walls 20Br, 20Bf are omitted. The welding projections 25 are raised toward the lateral walls 12B of the outer panel 12, and are scattered in the vertical direction of the vehicle. The raised welding surface 26 of each welding projection 25 is joined by spot welding to the inner surface of the lateral wall 12B.

Figure 7:
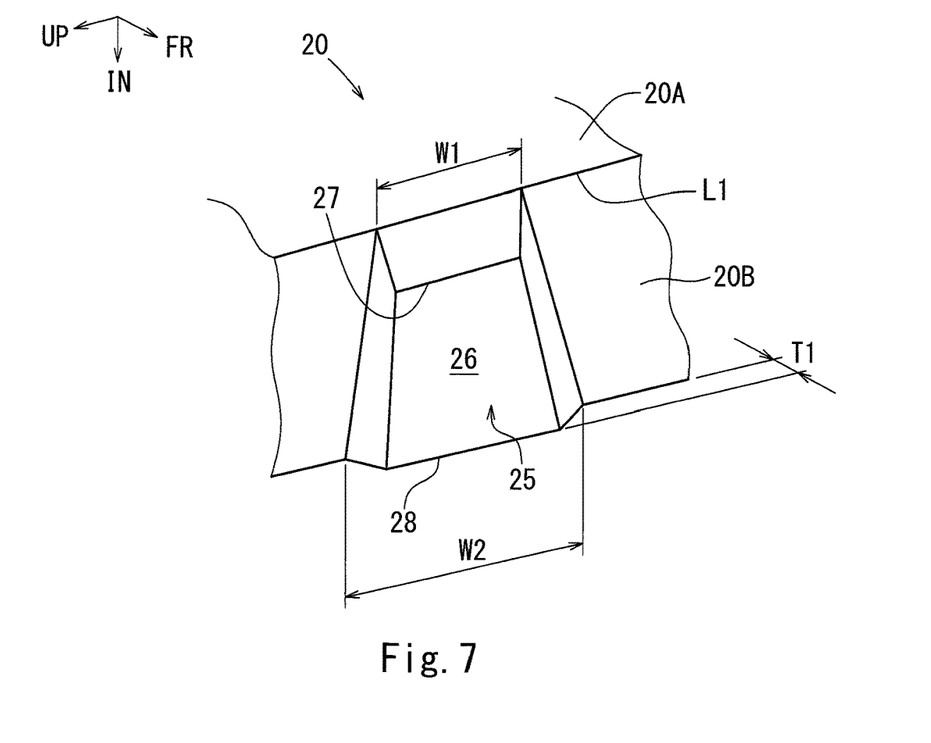
FIG. 7 is an enlarged perspective view of a welding projection formed in a lateral wall of a hinge reinforcement.

FIG. 7 schematically shows the welding projections 25 in the lateral wall 20B of the hinge reinforcement 20. Each welding projection 25 is raised outwardly from the lateral wall 20B of the hinge reinforcement 20 by a height T1. As shown in FIGS. 2 and 7, each welding projection 25 is raised outward from the hinge reinforcement 20 in an area that extends over the entire width of the lateral wall 20B, from the ridge line L1, which is formed between the lateral wall 20B and the top wall 20A, to the edge of the lateral wall 20B on the vehicle inner side. Each welding projection 25 has a sideways trapezoidal front shape, with a width W1 at the edge adjacent the ridge line L1 being narrower than a width W2 at the edge on the vehicle inward side. The edge of each welding projection 25 adjacent the ridge line L1 is beveled diagonally toward the ridge line L1.

The outer surface of each welding projection 25, that is, the raised welding surface 26, is flat, as shown in FIGS. 2 and 7, in order to secure the strength of the spot welding joint with each lateral wall 12B of the outer panel 12. Accordingly, the raised welding surface 26 has a flat surface which extends from the edge 27 of the lateral wall 20B adjacent the ridge line L1 to the edge of the lateral wall 20B on the vehicle inward side, and which has a sideways trapezoidal front shape, with the length of the edge 27 adjacent the ridge line L1 being smaller than the length of the edge 28 on the vehicle inward side.

As shown in FIG. 5, the lateral wall 20Bf of the hinge reinforcement 20 on the vehicle front side includes, in an area near the lower end, a flat surface portion 32 for attaching the lock striker 30 that locks the front door to the closed position. The shaded area in FIG. 5 indicates the striker mounting flat surface portion 32. The same area is shown enlarged in FIG. 6, in which the position where the lock striker 30 is to be arranged is shown by two-dot chain lines. The lock striker 30 is secured to the lateral wall 12B of the outer panel 12 and to the lateral wall 20B of the hinge reinforcement 20 via a planar lock striker base 31 supporting the body of the lock striker 30. The striker mounting flat surface portion 32 is therefore required to be formed flat without wrinkles and wrinkles.

Figure 6:
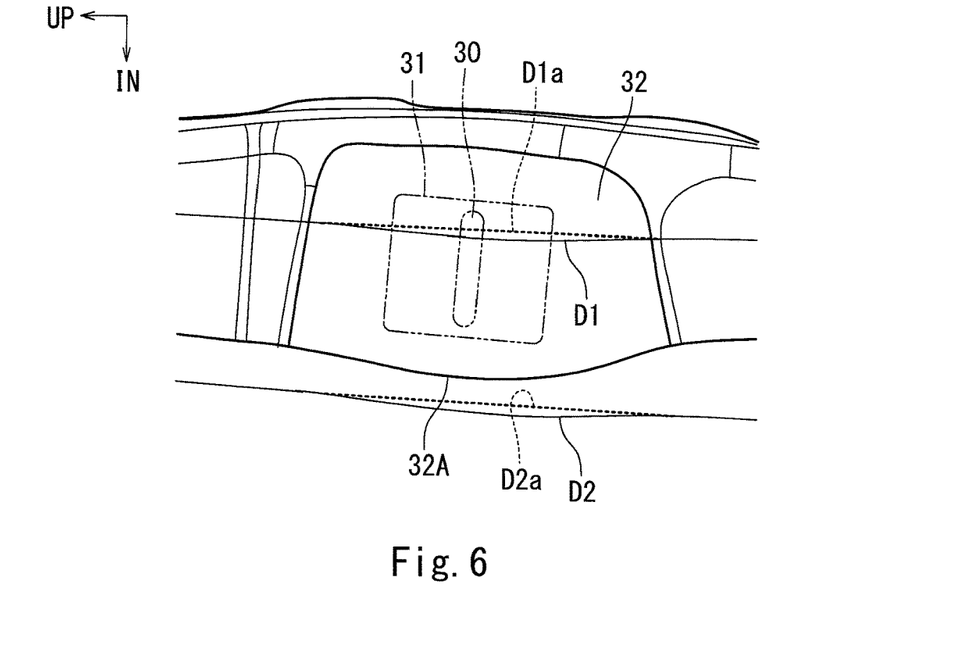
FIG. 6 is an enlarged view of a flat surface portion of the hinge reinforcement for mounting a lock striker, in circle VI defined in FIG. 5.

The flat surface portion 32 shown in FIG. 6 has an end edge 32A on the vehicle inward side which is formed convex toward the inside of the vehicle (downward as seen in FIG.

6) in the press forming process. The convex edge may be, for example, smoothly and gently curved. The flat surface portion 32 is formed in the process of press forming the hinge reinforcement 20.

Figure 8:
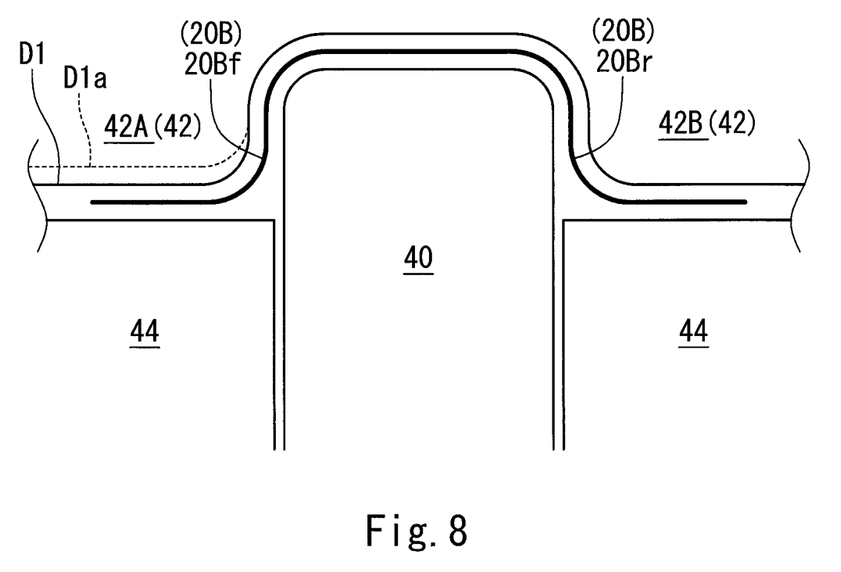
FIG. 8 is a conceptual sketch of a general configuration of a drawing process of a hinge reinforcement.
Figure 9:
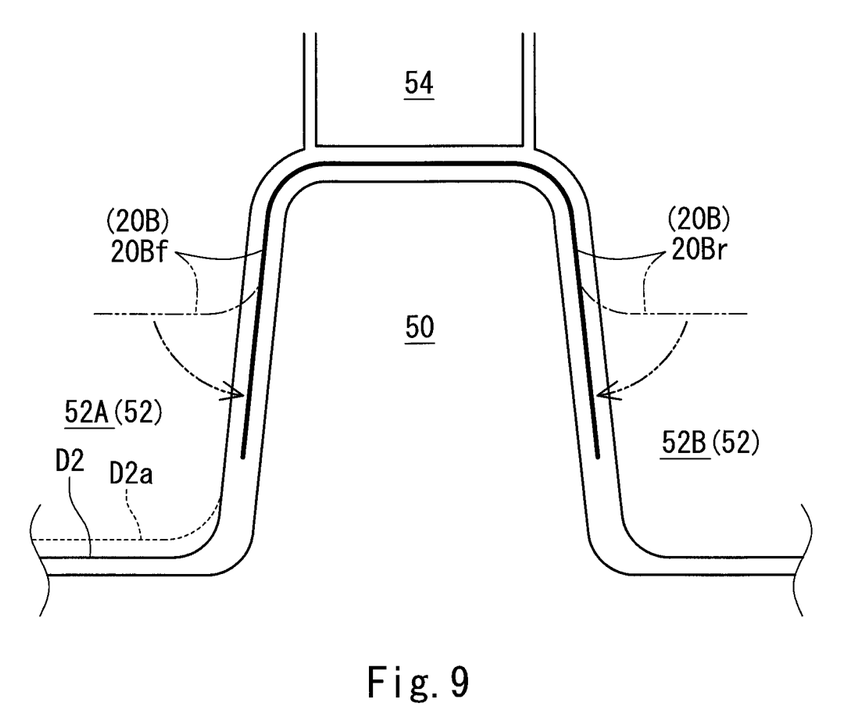
FIG. 9 is a conceptual sketch of a general configuration of an unbending process of a reinforcement.

A method of manufacturing the hinge reinforcement 20 by press forming will now be described with reference to FIGS. 8 and 9. The present method includes a drawing process as a first step, and an unbending process as a second step. FIG. 8 shows the arrangement of forming dies in the drawing process, and FIG. 9 shows the arrangement of forming dies in the unbending process. FIGS. 8 and 9 both illustrate the press forming of the flat surface portion 32 in the cross section taken along the line VII-VII of FIG. 5. The direction of pressing the hinge reinforcement 20 is indicated in FIGS. 4 and 5 by white arrow P.

FIG. 8 illustrates the drawing process of the first step. The drawing die includes a fixed lower die 40, a movable upper die 42, and cushioning dies 44 arranged on opposite sides of the lower die 40. The upper die 42 integrally includes a first portion 42A for drawing the lateral wall 20Bf on the forward side and a second portion 42B for drawing the lateral wall 20Br on the rearward side. The cushioning die 44 follows the movement of the upper drawing die 42.

The die face form of the portion 42A of the upper die 42 for forming the lateral wall 20Bf of the hinge reinforcement 20 will now be described. As shown in FIGS. 5 and 6 at D1 by a solid line, the portion of the die face that forms the striker mounting flat surface portion 32 has a convex surface, similar to the above-mentioned convex edge 32A of the flat surface portion 32 on the forward side in the pressing direction. That is, the convex surface of that portion of the die face is a smoothly and gently curved surface that swells forward in the pressing direction with reference to the die face forming the portions of the lateral wall 20Bf adjacent to the flat surface portion 32. A conventional, non-convex die face that forms the flat surface portion 32 is shown by a broken line D1a. The conventional die face position is also shown in FIG. 8, with broken lines. The die face being convex means that the depth of drawing at the flat surface portion 32 is larger than that at the adjacent portions.

FIG. 9 illustrates an unbending process of the second step. The unbending die includes a fixed lower die 50, a movable upper die 52, and a pad 54 for holding the workpiece being pressed. The upper die 52 includes, separately, a first upper die 52A for unbending the lateral wall 20Bf and a second upper die 52B for unbending the lateral wall 20Br. The pad 54 holds the drawn product (workpiece) of the first step against the lower die 50. The unbending process is performed with the workpiece held by the pad 54.

As described above, the die face form of the upper die 52A for unbending the lateral wall 20Bf is similar to that of the portion 42A of the upper die 42 forming the lateral wall 20Bf in the above-mentioned drawing process. Specifically, the die face form of the upper die 52A is as shown in FIGS. 5 and 6 by solid line D2. In the unbending process of the second step, the portion of the die face of the upper die 52A forming the striker mounting flat surface portion 32 has a convex surface, similar to the convex edge 32A of the flat surface portion 32 on the forward side in the pressing direction. That is, the convex surface of that portion of the die face is a smoothly and gently curved surface that swells forward in the pressing direction with reference to the die face forming the portions of the lateral wall 20Bf adjacent to the flat surface portion 32. The conventional die face position is indicated by a broken line D2a, as in the ease of drawing process in the first step.

Figure 11:
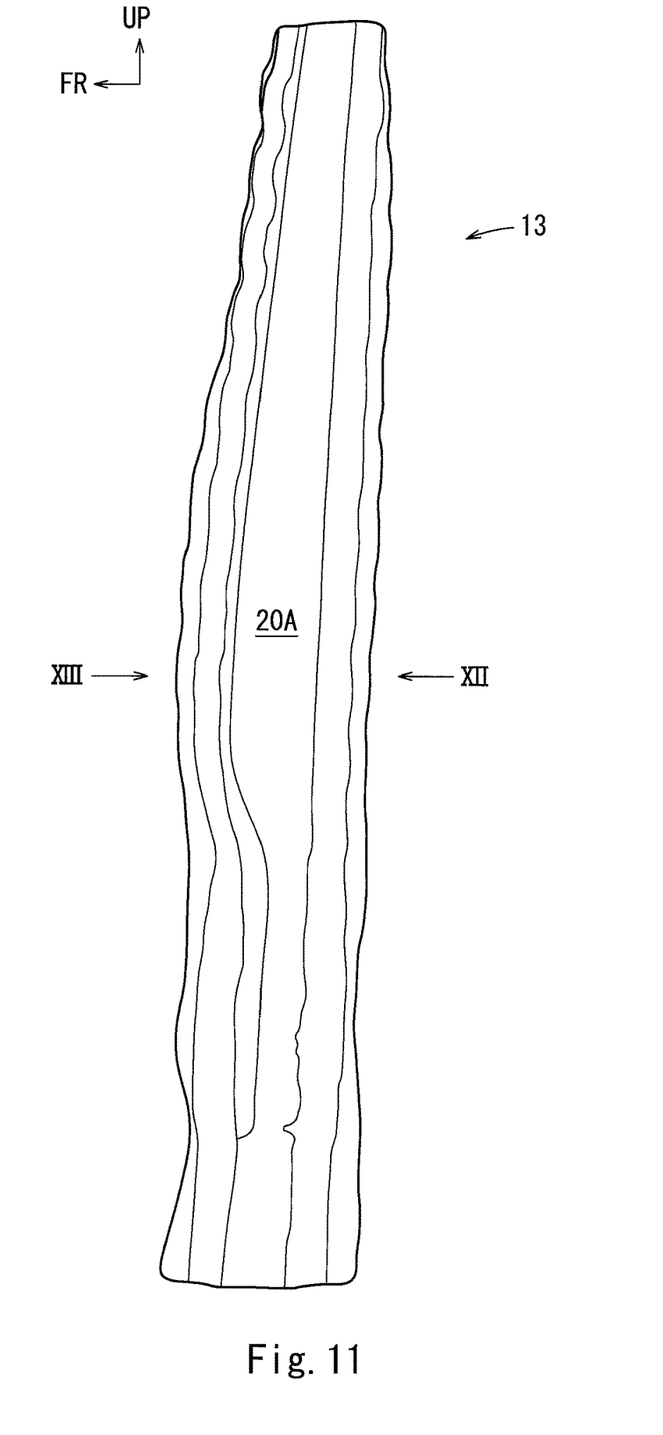
FIG. 11 is a front view of the top wall of a hinge reinforcement after the first step (after the drawing step) as seen from the outside of the vehicle.
Figure 12:
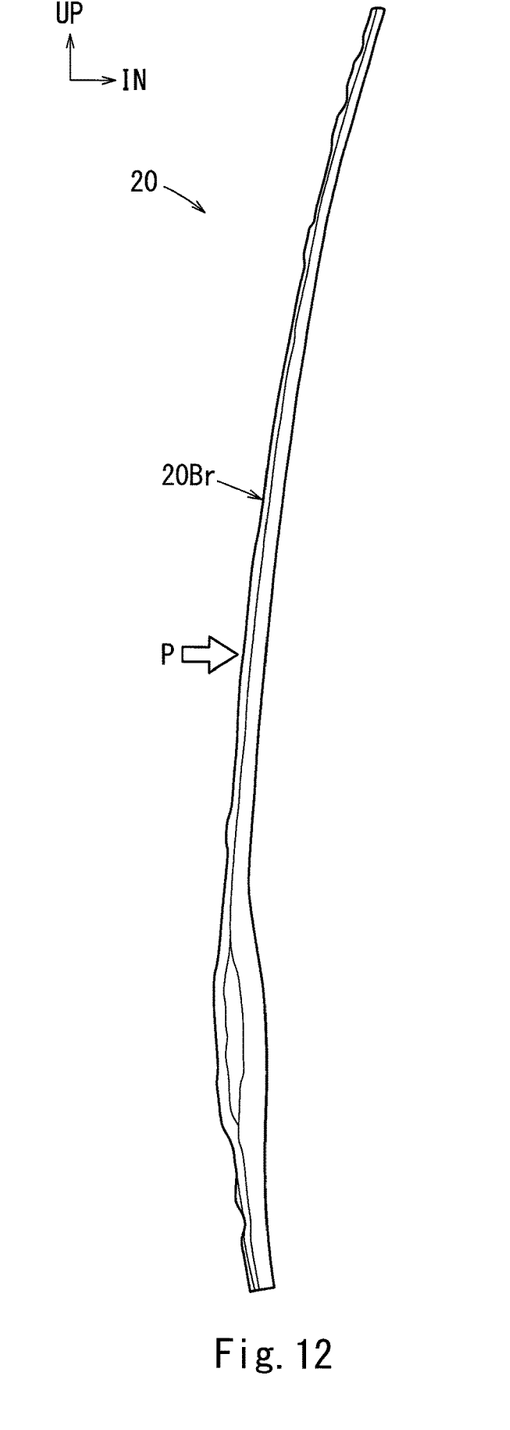
FIG. 12 is a side view of the lateral wall on the vehicle rearward side of the hinge reinforcement of FIG. 11 as seen from the direction of arrow XII.
Figure 13:
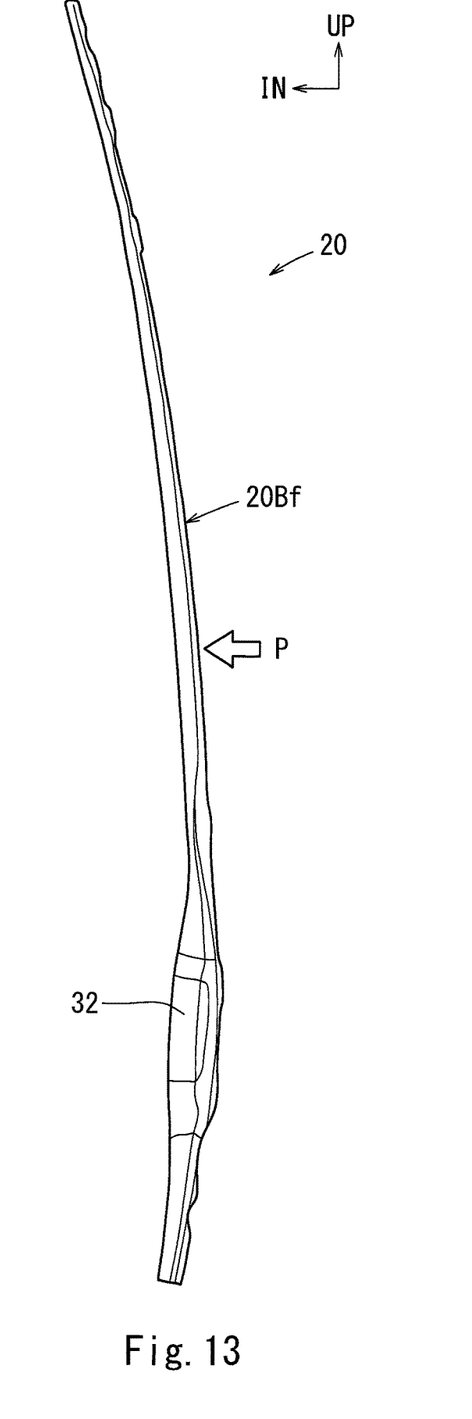
FIG. 13 is a side view of the lateral wall on the vehicle forward side of the hinge reinforcement of FIG. 11 as seen from the direction of arrow XIII.

As mentioned above, the press forming of the hinge reinforcement 20 includes the drawing process of the first step and the unbending process of the second step described above. The form of the hinge reinforcement 20 in the middle of the forming process after the drawing of the first step is shown in FIGS. 11 to 13. The final form of the hinge reinforcement 20 after the unbending of the second step is shown in FIGS. 3 to 5 mentioned above. FIG. 11 showing the form in the middle of the forming process is a view of the top wall 20A of the hinge reinforcement 20 as seen from the outside of the vehicle. FIG. 12 shows the lateral wall 20Br on the vehicle rearward side of the hinge reinforcement 20 of FIG. 11 as viewed from the direction of arrow XII. FIG. 13 shows a lateral wall 20Bf on the vehicle forward side of the hinge reinforcement 20 of FIG. 11 as viewed from the direction of arrow XIII. The pressing direction is indicated by white arrow P in each of these drawings as well. The press forming of the hinge reinforcement 20 is performed by pressurizing in the direction of arrow P. Note that in FIGS. 11 to 13, the welding projections 22 and 25 are not shown, as with FIGS. 3 to 5.

In FIG. 9 showing the unbending process of the second step, the two-dot chain lines indicates the cross-sectional form of the lateral wall 20B of the hinge reinforcement 20 (FIGS. 11 to 13) after the drawing process of the first step shown in FIG. 8. The hinge reinforcement 20 of this form is pressed by the upper unbending die 52, as shown by arrows in FIG. 9, into the form indicated by solid lines.

The striker mounting flat surface portion 32 of the lateral wall 20Bf on the vehicle forward side is formed during the press forming of the hinge reinforcement 20. For the purpose of forming the flat surface portion 32, the die face forming the flat surface portion 32 of each of the drawing and unbending upper dies 42A, 52A for the first and second steps is convex in the pressing direction at the forward edge. As a result, in the press forming process of either step, the forward edge pushes material from the center of the convex surface to both sides so that excess material due to the forming is moved aside without staying within the flat surface portion 32 and thus leveled off. This process prevents surface undulation from being formed in the area for the flat surface portion in the press forming of the flat surface portion 32. That is, the process prevents or suppress formation of wrinkles due to surface undulation.

When high-strength steel is used as the material for the press forming, wrinkles or surface undulation once formed in the area for the fiat surface portion during the press forming process are difficult to be flattened. Since the die face forming the striker mounting flat surface portion 32 is convex from the first, drawing step onward, as described above, wrinkles are prevented or suppressed even during press forming. This allows the flat surface portion 32 to be formed flat with high accuracy. As a result, the lock striker 30 can be accurately and reliably attached to the flat surface portion 32.

In the present embodiment, press forming is performed in the two steps of drawing and unbending process. Therefore, the product (workpiece) of the drawing step may have a series of shock lines caused by the drawing. Such shock lines are not so much as to affect the flatness, although they will not be removed by the subsequent unbending process.

In the above embodiments, the vehicle structural member is a center pillar and the reinforcement is a hinge reinforcement that reinforces the center pillar. However, in another embodiment, they may be another kind of pillar and reinforcement. Alternatively, they may be a vehicle structural member other than a pillar and a vehicle structural member for it.

The additional part attached to the lateral wall of the hinge reinforcement has been described as a lock striker for locking the vehicle door. However, in another embodiment, it may be a part other than a lock striker.

The additionally attached part has been described as being mounted to one of the lateral walls of the hinge reinforcement. However, in another embodiment, such parts may be attached to both lateral walls.

The press forming of the hinge reinforcement has been described as performed in two steps i.e. the drawing and unbending processes. However, in other embodiments, it may be performed in one step or in three or more steps.

In the embodiments described above, one of the lateral walls of the reinforcement includes a flat surface portion for mounting an additional vehicle part, and the flat surface portion has an edge forward in the direction of pressing the reinforcement, the forward edge being curved and convex in the press direction. As a result, during the process of press forming the flat surface portion, material in the forward edge in the pressing direction is pushed from the center of the convex shape to both sides so that the excess material due to the forming is moved aside without staying within the flat surface portion and thus leveled off. This effect of the pressing continues from the beginning to the end of the press forming process. This prevents or suppresses formation of wrinkles in the flat surface portion, and allows to form a highly accurate flat surface shape. As a result, the additional part can be attached with high accuracy.

In the above embodiments, the structural member for the vehicle is a pillar in a side of the vehicle, and the reinforcement is a hinge reinforcement reinforcing the pillar. In this case, the flat surface portion for attaching additional parts to the hinge reinforcement can be formed flat while preventing or suppressing formation of wrinkles. Therefore, the form of the pillar member reinforced by the hinge reinforcement can be made accurate.

In the above embodiments, the additional vehicle part is a striker for locking the vehicle door, and the striker is attached to the flat surface portion. This configuration allows the striker mounting flat surface portion to be formed flat with no or reduced wrinkles, resulting in the lock striker being mounted with high accuracy.

In the above embodiments, the reinforcement is manufactured by press forming with a press forming die, wherein the press forming die includes a first die face corresponding to the flat surface portion of the lateral wall and a second die face corresponding to a portion adjacent to the flat surface portion of the lateral wall, and the first die face is curved and convex in the pressing direction relative to the second die face. The use of press forming die having such a die face in press forming a reinforcement such as a hinge reinforcement allows the flat surface portion to be formed flat while preventing or suppressing wrinkles.

In the above embodiments, the step of press forming includes drawing the reinforcement with a drawing die and unbending the drawn reinforcement with an unbending die, wherein the drawing and unbending dies each have the above-mentioned curved and convex first die face. The use of these drawing and unbending dies in the press forming prevent or suppress formation of wrinkles in the flat surface portion in a more reliable way.

While described above referring to specific embodiments, the present disclosure is not limited to these examples, and those skilled in the art can make various substitutions, improvements, and/or modifications without departing from the objective of the present disclosure.

The invention claimed is:

1. A reinforcement for a vehicle structural member, comprising:
    a top wall, and
    opposite lateral walls extending from opposite edges of the top wall, wherein:
        at least one of the lateral walls includes a flat surface portion for mounting an additional vehicle part,
        the flat surface portion has an edge forward in a press direction in which the reinforcement is pressed, the edge being curved and convex in the press direction,
        the edge is on a vehicle inward side of the reinforcement with the edge being curved and convex toward the vehicle inward side, and
        the edge is a terminal edge.

2. The reinforcement according to claim 1, wherein the vehicle structural member is a pillar installed on a side of the vehicle, and the reinforcement is a hinge reinforcement for reinforcing the pillar.

3. The reinforcement according to claim 1, wherein the additional vehicle part is a striker for locking a vehicle door, and the striker is attached to the flat surface portion.

4. A method of manufacturing a reinforcement for a vehicle structural member according to claim 1, the method comprising:
    press forming the reinforcement with a press forming die, wherein:
    the press forming die includes a first die face corresponding to the flat surface portion of the lateral wall and a second die face corresponding to a portion of the lateral wall adjacent to the flat surface portion, and
    the first die face is curved and convex forward in the press direction relative to the second die face.

5. The method according to claim 4, wherein the step of press forming comprises:
    drawing the reinforcement with a drawing die, and
    unbending the drawn reinforcement with an unbending die,
    wherein the press forming die includes the drawing die and the unbending die, and
    wherein the drawing die and the unbending die each include the first die face that is curved and convex.

* * * * *